_UNITED STATES PATENT OFFICE._

EDWARD A. PATERSON, OF NORTH TONAWANDA, NEW YORK.

HYDROUS ALKALI-METAL SILICATE AND METHOD OF PRODUCING IT.

1,119,720.  Specification of Letters Patent.  Patented Dec. 1, 1914.

No Drawing.  Application filed June 20, 1914. Serial No. 846,401.

*To all whom it may concern:*

Be it known that I, EDWARD ALFRED PATERSON, a subject of the King of Great Britain, at present residing in North Tonawanda, county of Niagara, and State of New York, have invented certain new and useful Improvements in Hydrous Alkali-Metal Silicates and Methods of Producing Them, of which the following is a specification.

The object of this invention is to provide a dry alkali metal silicate containing a relatively large percentage of silica and sufficient alkali and contained water to render the silicate readily soluble in hot or cold water or in water at ordinary temperatures.

Broadly speaking my invention consists in adding to an alkali metal silicate, high in silica and low in alkali and containing little or no combined water, sufficient water to produce an amorphous, dry, hydrous alkali metal silicate which is soluble in cold water.

Silica is largely used in many industries, but for most purposes it must be furnished in such form that it can be dissolved and combined with other ingredients. If furnished in the form of an alkali metal silicate having a large percentage of alkali it is readily soluble, but the alkali is much more expensive than the silica and as the alkali is often not useful in the composition produced it is wasted and a large amount of the material paid for is thus lost. If the alkali metal silicate contains a large percentage of combined water the compound is also readily soluble, but in this form the material is often in a viscous condition, not easy to handle and not readily soluble, and besides is expensive to transport owing to the large percentage of water which it contains on which, of course, freight charges must be paid and other charges, such as for barreling, etc., must be met. Not only is it desirable to save the cost of the alkali in the mixture by having the silica content as large as possible, and to save the cost of expensive packaging, always incident to the transportation of heavy liquids, but also it is desirable to have as much silica as possible in the finished product, because of the inert and resistant nature of the silica itself, and on account of the hard, smooth, dense surface which it gives, and which is desirable under many conditions, particularly in road making.

According to my present invention I provide an alkali metal silicate containing a large percentage of silica and a relatively small percentage of alkali and also a relatively small percentage of combined water, and the mixture is either in a lumpy or powdered form in a crumbly condition and which need not be barreled, but may be packed in paper bags or the like, can be easily handled and readily dissolved.

The alkali metal silicate which I produce according to my invention has the general formula,

$$Na_2O\, nSiO_2\, nH_2O$$

$n$ before the $SiO_2$ radical indicating an indefinite number but more than one and preferably within the limits of 2 to 4, while before $H_2O$ it has a wider limit. In any event the compound contains much more silica than alkali and a low percentage of water molecularly combined.

My process consists essentially in adding water of hydration to or combining it with an anhydrous or an insufficiently hydrous alkali metal silicate. It is therefore distinguished from other processes in which some excess of water of hydration is removed from such silicate. The water of hydration which I add may be supplied largely by water itself or by the excess water in a weak solution of a silicate identical with or corresponding to the base silicate. In practising the process of my invention, I preferably start with sodium silicate glass, that is, a compound of silica and sodium produced by fusing together sand and soda. This glass is practically free from water of hydration. I, by preference, choose one which contains as much silica as practicable, or referring to the formula above, one in which the "$n$" is as large as may be. Preferably I grind this glass to a size small enough to pass a 60-mesh screen. To this glass or silicate so ground, I then add water and stir. I find it necessary to use from 40% to 50% of the weight of the silicate in water. I subject the water and silicate mixed as above stated to the action of steam at comparatively moderate or low temperature and pressure, say 100 pounds or below. Experience has shown that from 55 to 75 pounds pressure is the most efficient. Of course, it is well understood that the higher the pressure the quicker and more complete the hydration will be. If the pressure is too low, the process is delayed and the product is apt to be deficiently hydrated. If the pressure is too high, the hydration proceeds more rapidly, but may not be uniform. As a general rule, the higher the proportion of silica the greater the pressure demanded, but for practical purposes, the ordinary high silicate content product of the market, can be best treated at the pressure mentioned. As I have stated, this treatment causes the material to swell and to become hydrated to the desired extent. The material thus treated may contain after hydration as much as 19% of water. The function of the steam is to evaporate the excess water if any, as well as to supply additional water if needed and provide the pressure necessary for effecting hydration.

Instead of using water, I may use a weak solution of a silicate of soda, preferably a silicate of about the same proportion of silica as that which I have subjected to the grinding step at about 14° Twaddell. Of this solution, I use from twenty to thirty per cent. of the ground mass. A solution of the kind I have mentioned seems to enable me to effect hydration more rapidly than pure water, because owing to its viscous nature, it holds in the mass better, any steam generated therefrom.

After hydration is complete, which will be in from one-half to two hours, depending upon conditions, I open up the containing vessel and remove the hydrated material. The product is spongy, crumbly or friable, and may be easily broken up into small fragments at the place where it is to be used. It is of about the hardness of lump sugar but is tougher and also more porous.

I find in general, that hydration is accompanied, under the circumstances recited above, by the phenomenon known as intumescence; that is, the material, as hydration proceeds, grows porous or swells and becomes in character a concretely (as distinguished from discretely) intumesced substance somewhat like pumice stone. This characteristic makes the mass easier to dissolve because it is hydrated with great uniformity. When I use a solution of sodium silicate, the phenomenon mentioned is perhaps a little more pronounced, than when I use water, because the viscous nature of the solution, as stated above, delays or prevents the escape of steam or gases from the material undergoing treatment.

The material produced may be broken up, and if desired, powdered, for transportation purposes, and when used may be easily dissolved in either cold or hot water very quickly. The length of time for treatment varies according to the quantity of the material being treated. Where, for instance, the thickness of the material is one inch, I have found that the treatment may be perfected in from fifteen to twenty minutes.

During the treatment, as I have said, the mass swells and becomes porous and friable, and when properly hydrated usually contains from eight per cent. to twelve per cent. of water. A smaller proportion of water of hydration is sometimes as low as six per cent., which is, however, enough in some instances. It should be understood in this connection, that the water of hydration and the alkali present in the silicate, are factors tending toward easy solution, whereas the silica content is a factor tending in the other direction. The problem is to get as much silica in the mass as possible and still have it easily soluble in cold water. As too much alkali would make the product expensive, and would be otherwise objectionable, the solution of this problem is getting into the anhydrous mass a percent of water of hydration sufficiently large to meet the required conditions and yet not too much. Too much water of hydration may cause the mass to run and become sticky, besides adding to the expense of transportation. The limit is about nineteen per cent.

While I have specified sodium silicate, I do not wish to be restricted to this particular material, as there are various equivalents therefor, potassium silicate being one, which might be used. Sodium silicate is, however, all things considered, the cheapest and best available.

I claim as my invention:

1. A substantially homogeneous, dry, amorphous, alkali metal silicate, having a large percentage of silica and a relatively small percentage of alkali, said silicate being in a spongy condition suitable for use in such condition, or for being ground into a powder, and containing combined water sufficient to make it readily soluble in cold water.

2. The method of producing a dry, soluble, hydrous, alkali metal silicate, which consists in subjecting an alkali metal silicate containing a large percentage of silica and in a ground and moist condition, to a hydrating treatment under low steam pressure in a closed vessel, until the material becomes sufficiently hydrated to render it, though high in silica, soluble in cold water.

3. The method of producing a dry, hydrous, amorphous, alkali metal silicate which consists in subjecting an alkali metal silicate, containing a large percentage of silica and in a ground condition, to a hydrating treatment under heat and pressure until the silicate in an amorphous condition is sufficiently hydrated.

4. The method of producing hydrous, amorphous, alkali metal silicate, which consists in mixing with ground alkali metal silicate, containing a large percentage of silica, a solution of substantially the same silicate and subjecting this mixture to a hydrating treatment under heat and pressure until the silicate assumes a spongy condition and becomes hydrated.

5. The method of producing a readily soluble alkali metal silicate containing a large percentage of silica and a small percentage of alkali, which consists in wetting an alkali metal silicate containing a large percentage of silica and lacking in combined water, and in subjecting the wet material to heat and pressure until the material assumes a spongy condition which is uniformly hydrated and the mass contains less than 19 per cent. of combined water.

In testimony whereof, I have hereunto subscribed my name.

EDWARD A. PATERSON.

Witnesses:
   LLOYD B. WIGHT,
   A. B. FRANZONI.